United States Patent [19]

Smith

[11] 4,117,636

[45] Oct. 3, 1978

[54] PLASTIC COVERED GUTTER CONNECTED GREENHOUSE BUILDING STRUCTURE

[75] Inventor: Richard W. Smith, Rumson, N.J.

[73] Assignee: X. S. Smith, Inc., Red Bank, N.J.

[21] Appl. No.: 790,111

[22] Filed: Apr. 22, 1977

Related U.S. Application Data

[63] Continuation of Ser. No. 731,863, Oct. 13, 1976, abandoned.

[51] Int. Cl.$^2$ .................... E04B 1/315; E04D 13/00
[52] U.S. Cl. ............................................. 52/13; 52/63; 52/222; 24/263 A
[58] Field of Search ...... 135/15 CF, DIG. 1, DIG. 5, 135/7.1 R; 52/86, 13, 63, 2, 222; 24/263 A, 263 LS, 248 FS; 160/402, 395, 381, 378, 397

[56] References Cited

U.S. PATENT DOCUMENTS

| | | | |
|---|---|---|---|
| 1,779,859 | 10/1930 | Shrauger | 160/397 |
| 3,777,425 | 12/1973 | Bourgeois | 52/63 |
| 3,911,632 | 10/1975 | Bryfogle | 52/63 |
| 3,930,344 | 1/1976 | Gahler | 52/2 |

FOREIGN PATENT DOCUMENTS

2,160,241  6/1973  Fed. Rep. of Germany .............. 52/86

Primary Examiner—John E. Murtagh
Attorney, Agent, or Firm—Nolte & Nolte

[57] ABSTRACT

A plastic covered gutter connected greenhouse structure comprised of metal framing covered by superimposed layers of plastic sheets having an inflated area between the sheets providing insulation to the interior of the structure. The superimposed plastic sheets of adjacent greenhouses are secured to the gutter which inter-connects the same. In this respect, the outer edges of the gutters provide male and female elements having mating V-shaped sections provided with inter-fitting splines on opposing surfaces thereof between which the plastic sheets are clamped. The male and female members are fitted so that screw members which maintain the parts in assembly are threaded through an outer flange of the female member and are perpendicular to the inter-fitting splines.

6 Claims, 12 Drawing Figures

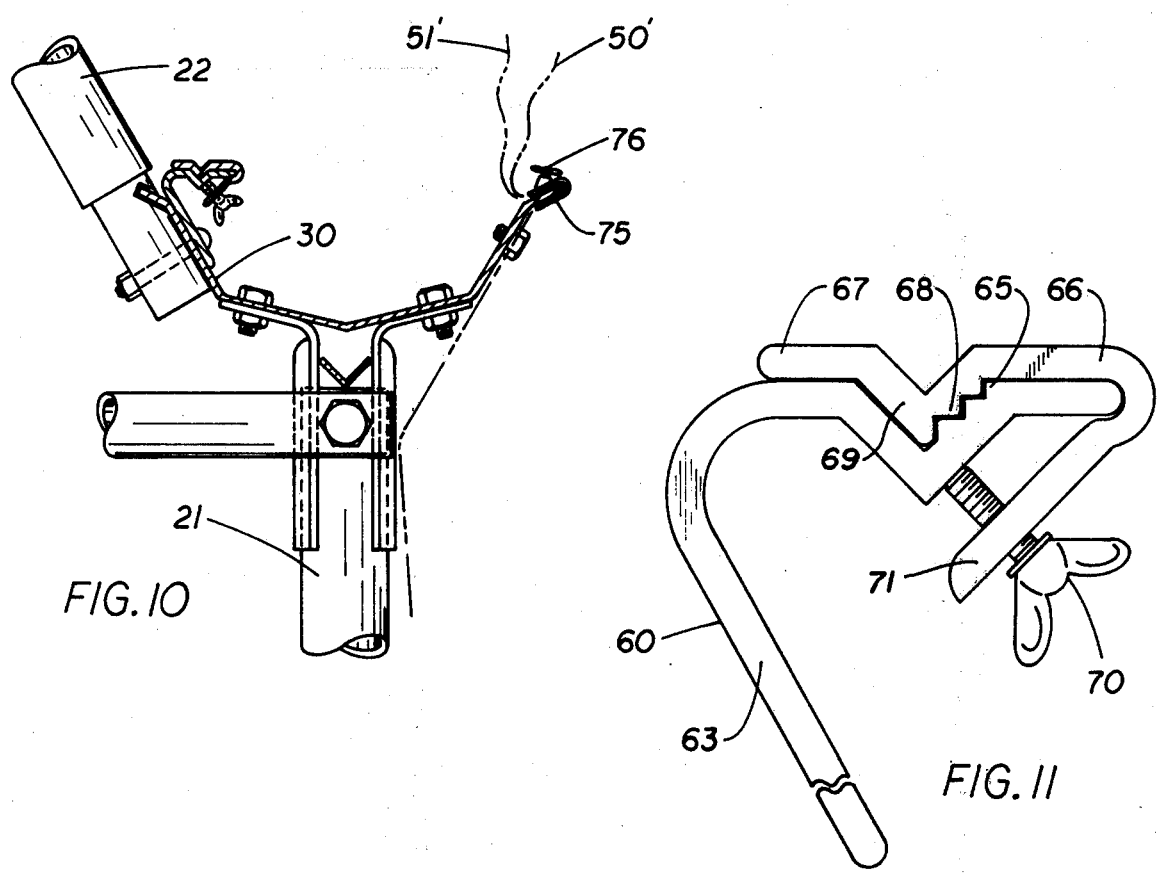
FIG. 10
FIG. 11
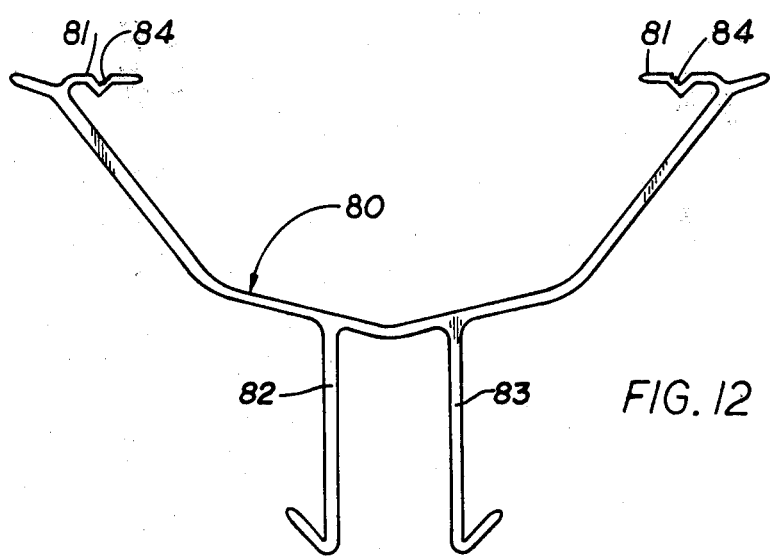
FIG. 12

PLASTIC COVERED GUTTER CONNECTED GREENHOUSE BUILDING STRUCTURE

This is a continuation of application Ser. No. 731,863, filed Oct. 13, 1976, now abandoned.

BACKGROUND OF THE INVENTION

As is discussed in U.S. Pat. Nos. 3,791,076, 3,830,033 and 3,930,344, attention has been given to providing the metal frames of greenhouses with fastening means for securing plastic sheets to the frames to provide holding power all along the length of the plastic sheets. An excellent structure for such a purpose is disclosed in the aforementioned patents.

A similar problem arises in gutter connected greenhouses and is compounded as these structures may extend up to 500 feet in length with a large number of rafter members from adjacent greenhouses supported, via connections, to either side of an intermediate gutter which in turn is supported upon internal common columns. It is the primary object of the present invention to provide fastening means for securing plastic cover sheets to a bearing gutter which interconnects adjacent greenhouses.

The present invention provides an effective fastener for the plastic sheets along the edges of the gutters and in so doing, provides a fastening device which can also be utilized along the side and lower portions of a greenhouse structure if so desired.

The invention then provides, along each of the upper edges of the connecting gutter between two greenhouses, male and female members extending the length of the roof structure and having mating V-shaped sections provided with similarly longitudinally extending splines on opposing surfaces, between which the ends of the plastic roof sheets are clamped, the female member providing a longitudinally extending outer flange facing the splined sections of the male and female member and generally parallel therewith. The flange provides at spaced intervals along its length, internally threaded screw holes for the reception of thumb screws which can be "bottomed out" when tightened against the male member; that is, the screws are threaded at a ninety degree angle to the flange of the female member and to the inter-fitting splines of the male and female members.

It can be appreciated that the male and female members of the gutter can be provided at the terminal side of the greenhouse which is not gutter connected to another greenhouse and can provide means for securing the terminal end of side-wall sheets to the greenhouse.

BRIEF DESCRIPTION OF THE DRAWINGS

The invention will now be better understood with reference to the specific embodiments thereof taken in conjunction with the drawings, in which:

FIG. 10 is a sectional view taken along the lines 10—10 of FIG. 1;

FIG. 11 is a further end elevational view of the male and female members shown in FIG. 3 showing the details of construction thereof;

FIG. 12 is an end view of a gutter extrusion incorporating constructions of the invention.

DESCRIPTION OF THE PREFERRED EMBODIMENTS

Figure 1:
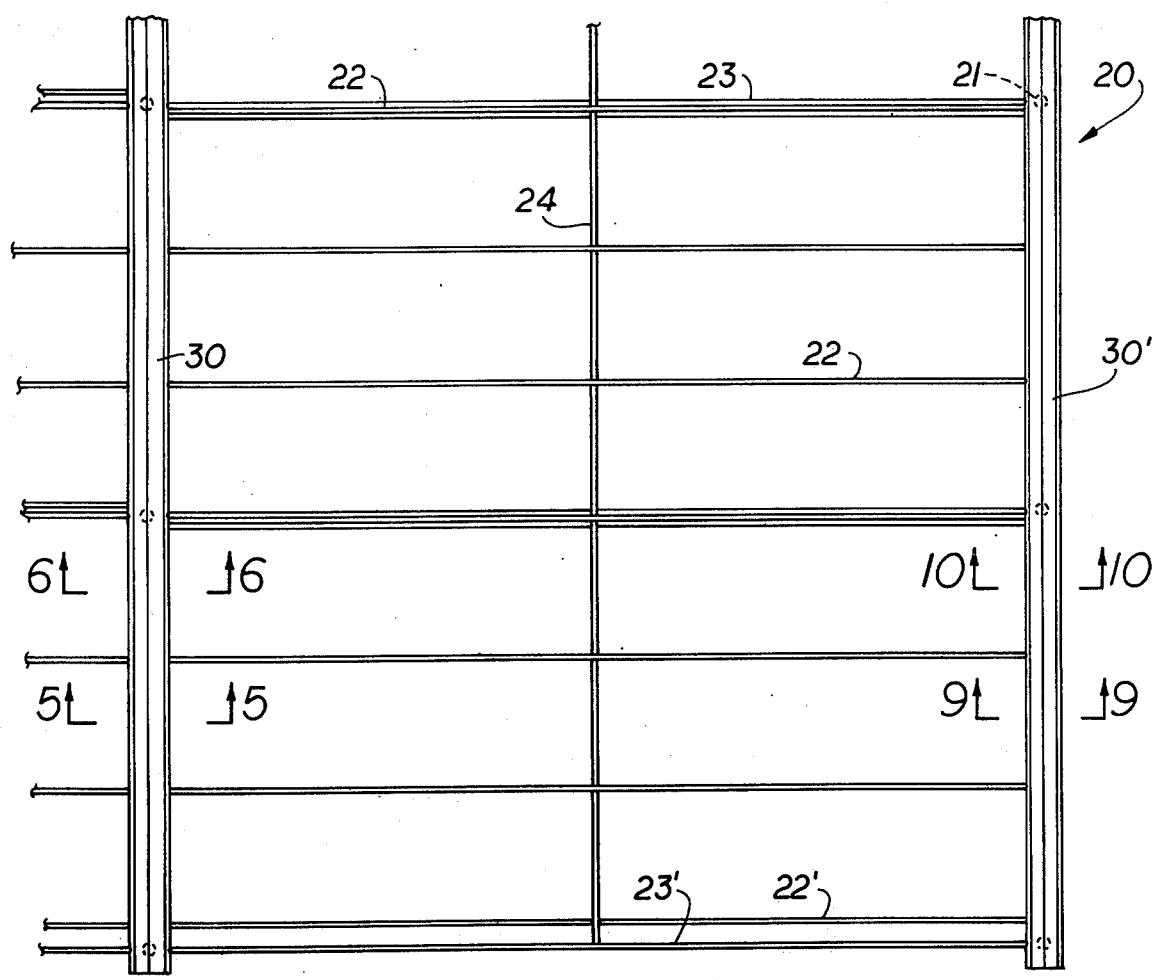
FIG. 1 is a plan view of the forward section of a gutter connected greenhouse structure in accordance with the present invention.
Figure 2:
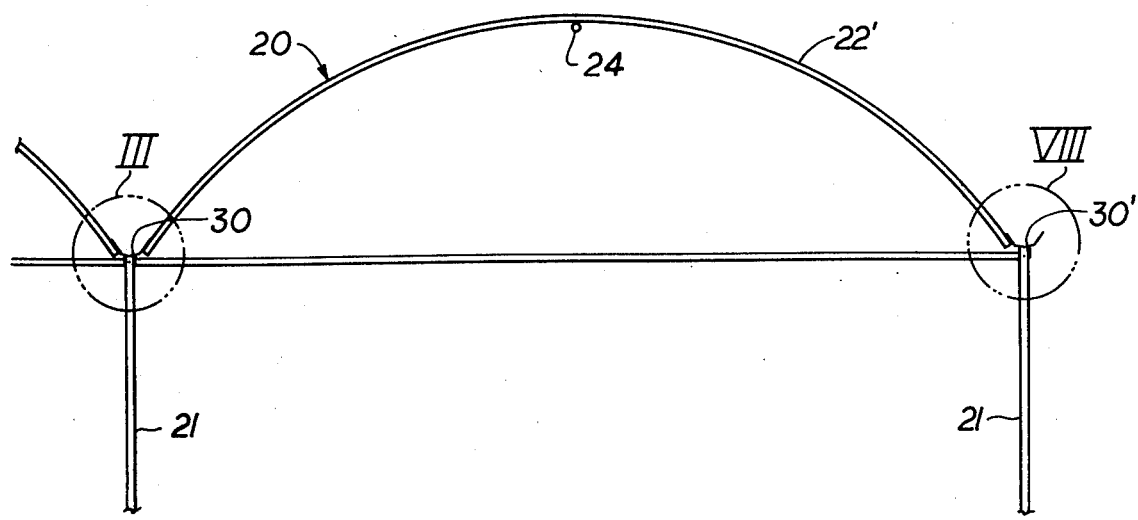
FIG. 2 is a front elevation of the structure shown in FIG. 1.

Referring now to FIGS. 1 and 2 which show the general construction of a gutter connected greenhouse fabricated in accordance with the invention, vertical, internal columns 21 are spaced along the longitudinal extension of the greenhouse 20 and are supported in conventional concrete pads, not shown. The columns 21 support at their upper ends longitudinally spaced rafter members comprising internal bows 22 and end bows 22', only one of which is shown, via their end connections to a steel greenhouse connecting gutter 30 and terminal gutter 30'. Pipe collar beams 23 extend between and connect the upper ends of the internal columns 21 and end wall column beam 23' extends between and interconnects the columns 21 at the ends of the greenhouse. A ridge poll 24 extends between and inter-connects the bows 23, 23' along the center of the greenhouse structure.

Various truss, cable and bracing structures are also used in the construction of the type of greenhouse being discussed and which are for the purposes of clarity eliminated from the present disclosure inasmuch as they do not form a part of the invention.

Referring now to FIGS. 3-7, there are nut and bolt connections 25 between the end column beams 23' and column beams 23 of laterally adjacent greenhouses and their common support columns 21. A collar beam bushing 26 (FIG. 4) spaces the end column beams 23' from the endmost columns 21 for purposes unrelated to the present discussion.

The greenhouse interconnecting gutter 30 extends longitudinally between adjacent greenhouses and is supported at the top of the columns 21 by gutter support brackets 31 (FIG. 3) clamped to the column ends via splice plates 32 and by nut and bolt connections 33. Nut and bolt connecting 34 secure the arms of gutter support brackets 31 to the floor of the gutter 30.

The rafter members or bows 22, 22' of adjacent greenhouses are connected to the walls of the gutter 30 via gutter bow connectors 40 which are inserted in the ends of the bows and provide slots 41 at their exposed ends for insertion therein of the flared tops of the gutter walls.

A suitable drip gutter 45 is suspended via drip gutter brackets 46 longitudinally spaced and connected via nut and bolt connections 47 along the length of the gutter floor.

Figure 8:
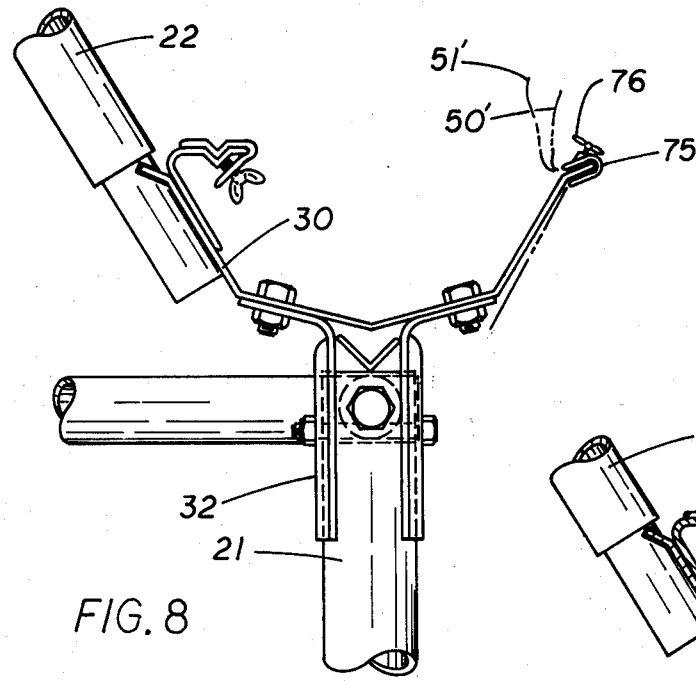
FIG. 8 is an enlarged view of the encircled area of FIG. 2 marked VIII.
Figure 9:
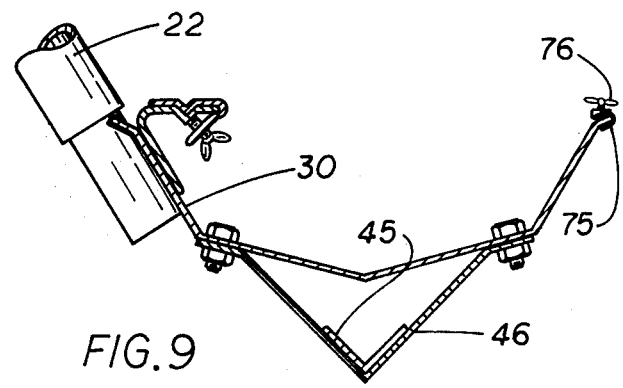
FIG. 9 is a sectional view taken along the lines 9—9 of FIG. 1.

The terminal or end gutter 31, shown in FIGS. 8-10 is of the same construction as the gutter 30 shown in FIGS. 3-7 as are the column, beam and rafter structures just described, and similar reference numerals have been applied to the same parts shown in FIGS. 8-10 as were described in the previous figures. It is seen that the end gutter 31 only connects and supports the outer ends of the rafter members of the end greenhouse along the inner wall of the gutter and that the outer wall of the gutter is free.

Figure 3:
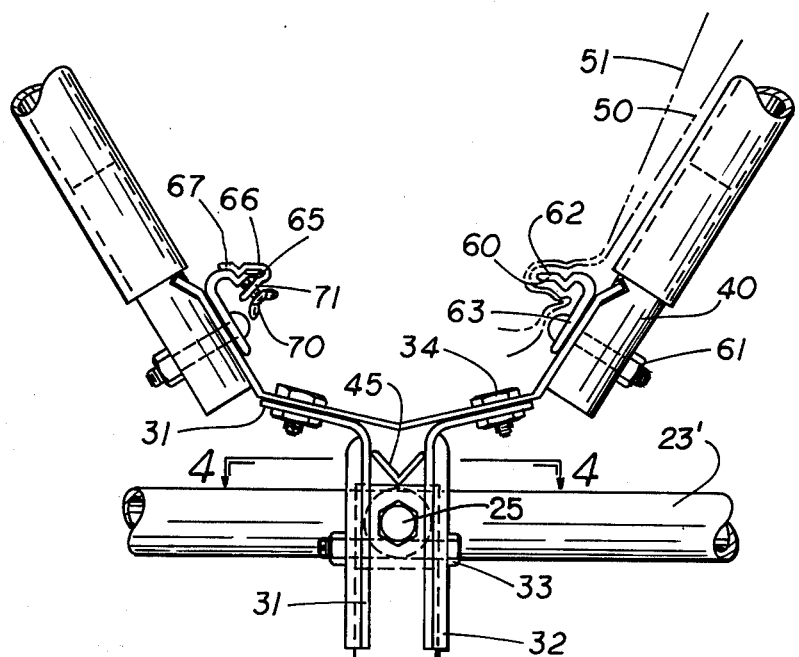
FIG. 3 is an enlarged view of the encircled area of FIG. 2 marked III.
Figure 4:
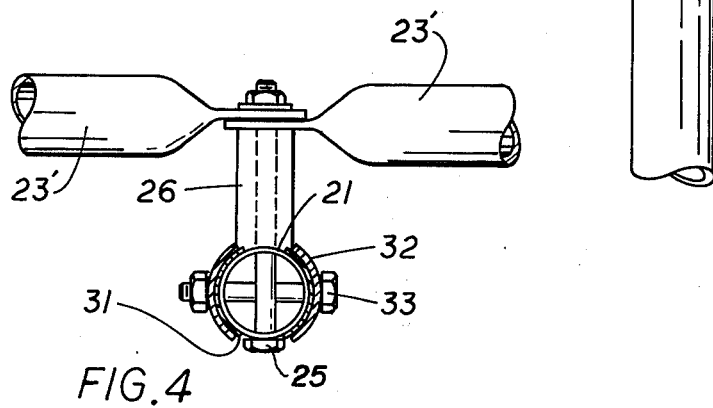
FIG. 4 is a sectional view taken along the lines 4—4 of FIG. 3.
Figure 5:
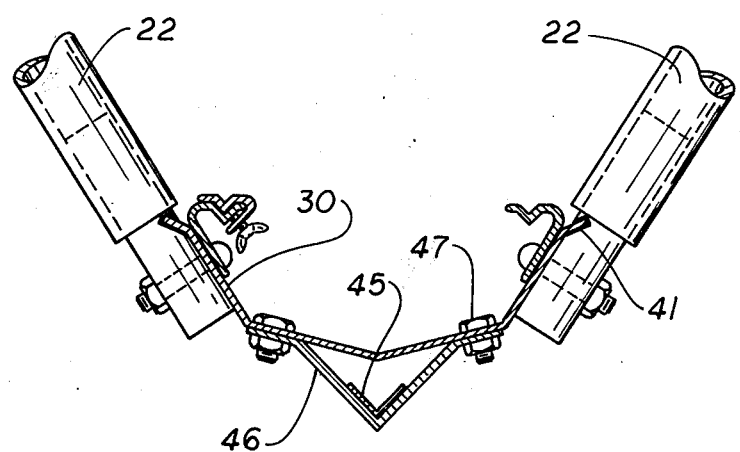
FIG. 5 is a sectional view taken along the lines 5—5 of FIG. 1.
Figure 6:
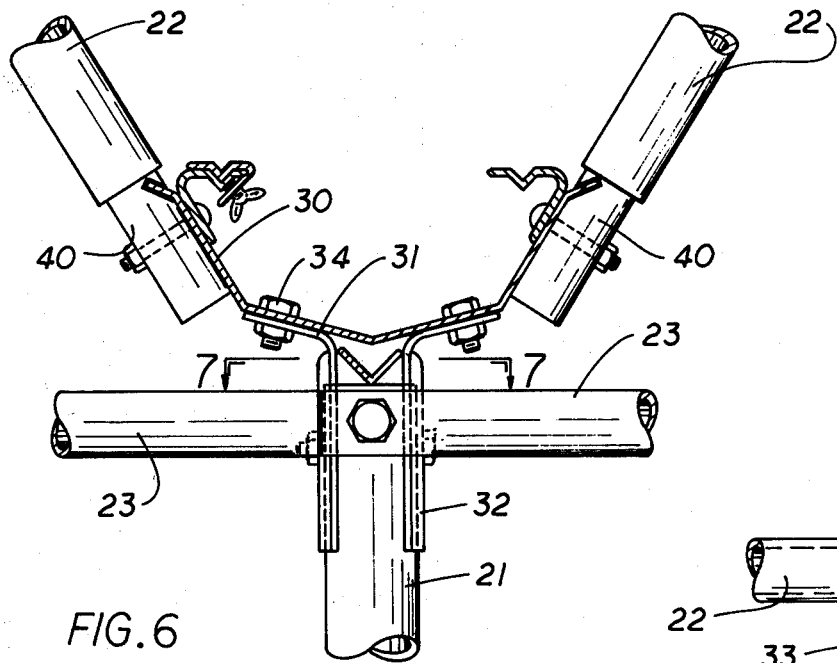
FIG. 6 is a sectional view taken along the lines 6—6 of FIG. 1.
Figure 7:
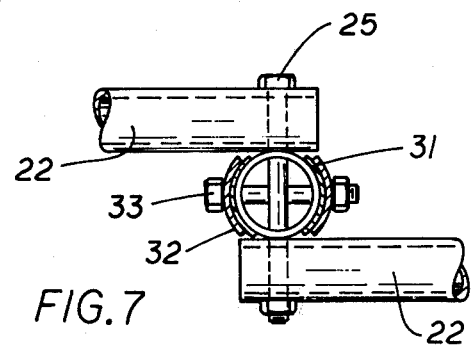
FIG. 7 is a sectional view taken along the lines 7—7 of FIG. 6.

After the frame structure just described, has been erected, ths superimposed layers of plastic sheets 50, 51 (FIG. 3) are laid over the bows 22 and their ends are folded around and tucked under the horizontally disposed leg 62 of male member 60, best disclosed in FIGS. 3 and 11, one of each of which is secured via connecting leg 63 of the male member along the length of the tops of the upwardly extending walls of the gutter 30 by nut and bolt connections 61. The horizontally disposed leg 62 extends outwardly from the connecting leg 63 and provides a V-shape indentation 64, one of the upper surfaces of which is splined as at 65 (FIG. 11).

After the ends of the plastic sheets are folded around and tucked beneath the leg 62 of the male member 60, a female member 66 is clamped around the male member to capture the ends of the plastic sheets.

The horizontally disposed leg 67 of the female member 66 is provided with a V-shaped protrusion 69, one of the under surfaces of which is splined as at 68 to mate with the splines 65 of male member 60 for gripping of the ends of the plastic sheets.

The female member 65 is secured to the male member 60 via thumb screws 70 threaded within appropriate holes spaced along the length of tightening flange 71 of the female member 65 formed to underlie the inter-fitting splines of the male and female members so as to press the members together with the plastic sheet ends between.

It is noted that the flange 71 of the female member is formed to extend parallel with the inter-engaging splines of the mating members 60, 65 and in this respect the thumb screws 70 "bottom out" against the under surface of the splined leg of the V-shaped indentation 67 of the male member, which also extends parallel to the splines, providing a forceful engagement between the splines of the members with the ends of the plastic sheets therebetween.

Referring again to FIGS. 8–10, it is noted that the end gutter may provide a different female member along the free end wall, eliminating the necessity for providing a separate male member and providing for capturing the ends of plastic sheets which may be utilized as wall covers for the side of the structure. In this respect the plastic ends of the plastic sheets 50′, 51′ are clamped around the free flared top of the outer gutter wall between the legs of a U-shaped female member 75 via the action of thumb screws 76 spaced along the length of the inner leg of female member 70.

Alternatively, the male and female members 60, 65 previously described, may be provided along the outer wall of the gutter for clamping the ends of the plastic sheets 50′, 51′ forming the outer sidewall of the structure.

The male and female of the invention can conveniently be applied to existing gutter connected greenhouse structures, as can be readily appreciated. Alternatively, the present invention contemplates the provision of a unitary gutter extrusion shown in FIG. 12 in which the gutter 80 and male member 81 are formed integrally along with the flared upper portions of the gutter which are inserted into the slots of the gutter connectors. Appropriate sub-structure support legs 82–83 from part of the extrusion for assembly with support columns 21. It is noted that the splines along the indented V-shaped portion of the horizontal leg 84 are provided for inter-engagement with a female member of the invention, not shown in FIG. 11, to secure the ends of plastic covers as previously described.

The invention has been described in conjunction with specific embodiments thereof and modifications of invention will occur to those skilled in the art. The invention is therefore limited to what is now claimed.

What is claimed is:

1. In a greenhouse building structure comprising a plurality of rafter members positioned in spaced apart relationship, and secured at their ends upon columns, fastening means for securing the ends of plastic covers along the length of the structure, said fastening means comprising a longitudinally extending male member, a longitudinally extending female member, said members providing inter-fitting splined portions along their length within a V-shaped clamping area and between which the end of a plastic cover is to be clamped, said female member providing a flange integrally formed and extending substantially along the length thereof parallel with said splined portions and screw means perpendicular to and threaded through said flange for pressing against an outer surface of a leg of the Vshaped area of said male member for clamping said splined portions and said V-shaped areas together.

2. The greenhouse building structures of claim 1 wherein said rafters form the roof structures of adjacent greenhouses and a gutter having a floor and sidewalls extends between said adjacent greenhouse roof structures with means interconnecting the ends of said rafters and said gutter, said columns supporting said gutter, and said fastening means extend along and are connected to the tops of the gutter walls.

3. The greenhouse building structure of claim 2 wherein the male member of said fastening means and said gutter are formed integrally.

4. In a greenhouse building structure, fastening means for securing the edges of plastic covers along the length of the structure, said fastening means comprising a longitudinally extending male member, and a longitudinally extending female member, said members providing inter-fitting splined portions along their lengths and between which the edge of the plastic cover is to be clamped, and means for clamping said members together, said clamping means comprising a flange integrally formed and extending from one of said members substantially along the length thereof and lying along a plane spaced from and parallel with said splined portions and providing means extending through said flange and acting in planes perpendicular thereto and to the splined portion of the other of said members for contacting the splined portion of the other of said members and for retaining said members together in press contact for clamping said splined portions together.

5. The greenhouse building structure of claim 4, comprising a plurality of rafter members positioned in spaced apart relationship and secured at their ends upon columns wherein said rafters form the roof structures of adjacent greenhouses and a gutter having a floor and sidewalls extends between said adjacent greenhouse roof structures with means interconnecting the ends of said rafters and said gutter, said columns supporting said gutter, and wherein said fastening means extend along and are connected to the tops of the gutter walls.

6. The greenhouse building structure of claim 5 wherein one of said members of said fastening means and said gutter are formed integrally.

* * * * *